(12) United States Patent
Chan et al.

(10) Patent No.: US 9,970,114 B2
(45) Date of Patent: May 15, 2018

(54) SHIELDING COATING FOR SELECTIVE METALLIZATION

(71) Applicant: Rohm and Haas Electronic Materials LLC, Marlborough, MA (US)

(72) Inventors: Hung Tat Chan, Tin Shui Wai (HK); Ka Ming Yip, Tai Wai (HK); Chit Yiu Chan, Shatin (HK); Kwok Wai Yee, Yuen Long (HK)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 100 days.

(21) Appl. No.: 15/263,655

(22) Filed: Sep. 13, 2016

(65) Prior Publication Data
US 2018/0073149 A1    Mar. 15, 2018

(51) Int. Cl.
| | |
|---|---|
| H01B 13/00 | (2006.01) |
| C23C 18/16 | (2006.01) |
| C23C 18/38 | (2006.01) |
| C23C 18/18 | (2006.01) |
| C09K 13/00 | (2006.01) |
| C23C 18/22 | (2006.01) |
| C23C 18/20 | (2006.01) |
| B05D 5/06 | (2006.01) |
| C08J 7/04 | (2006.01) |
| B05D 1/02 | (2006.01) |
| B05D 1/18 | (2006.01) |
| B05D 3/00 | (2006.01) |

(Continued)

(52) U.S. Cl.
CPC .......... *C23C 18/1612* (2013.01); *B05D 1/02* (2013.01); *B05D 1/18* (2013.01); *B05D 3/007* (2013.01); *B05D 3/06* (2013.01); *B05D 5/068* (2013.01); *B05D 5/08* (2013.01); *C08J 7/045* (2013.01); *C23C 18/165* (2013.01); *C23C 18/1641* (2013.01); *C23C 18/38* (2013.01); *B05D 2201/02* (2013.01); *B05D 2505/00* (2013.01); *C08J 2379/02* (2013.01)

(58) Field of Classification Search
None
See application file for complete search history.

(56) References Cited

U.S. PATENT DOCUMENTS

| | | |
|---|---|---|
| 6,338,869 B1 | 1/2002 | Nakano et al. |
| 6,909,018 B1 | 6/2005 | Melder et al. |

(Continued)

FOREIGN PATENT DOCUMENTS

| | | |
|---|---|---|
| JP | 201629209 | 3/2016 |
| WO | 2011093934 | 8/2011 |
| WO | 2012060115 | 5/2012 |

*Primary Examiner* — James Mellott
(74) *Attorney, Agent, or Firm* — John J. Piskorski

(57) ABSTRACT

Shielding coatings are applied to polymer substrates for selective metallization of the substrates. The shielding coatings include a primer component and a hydrophobic top coat. The primer is first applied to the polymer substrate followed by application of the top coat component. The shielding coating is then selectively etched to form an outline of a desired current pattern. A catalyst is applied to the patterned polymer substrate followed by electroless metal plating in the etched portions. The portions of the polymer substrate which contain the shielding coating inhibit electroless metal plating. The primers contain polyamines and the top coat contains hydrophobic alky organic compounds.

17 Claims, 1 Drawing Sheet

(51) Int. Cl.
*B05D 3/06* (2006.01)
*B05D 5/08* (2006.01)

(56) References Cited

U.S. PATENT DOCUMENTS

| | | |
|---|---|---|
| 7,060,421 B2 | 6/2006 | Naundort et al. |
| 7,578,888 B2 | 8/2009 | Schildmann |
| 7,972,655 B2 | 7/2011 | Abys et al. |
| 8,282,743 B2 | 10/2012 | Bonnechere et al. |
| 8,974,869 B2 | 3/2015 | Hamilton et al. |
| 9,000,218 B2 | 4/2015 | Wigbers et al. |
| 9,797,043 B1 * | 10/2017 | Chan ................... C23C 18/1893 |
| 9,850,578 B1 * | 12/2017 | Chan ................... C23C 18/1639 |
| 2005/0175824 A1 * | 8/2005 | Wakizawa ............. H05K 3/389 |
| | | 428/209 |

* cited by examiner

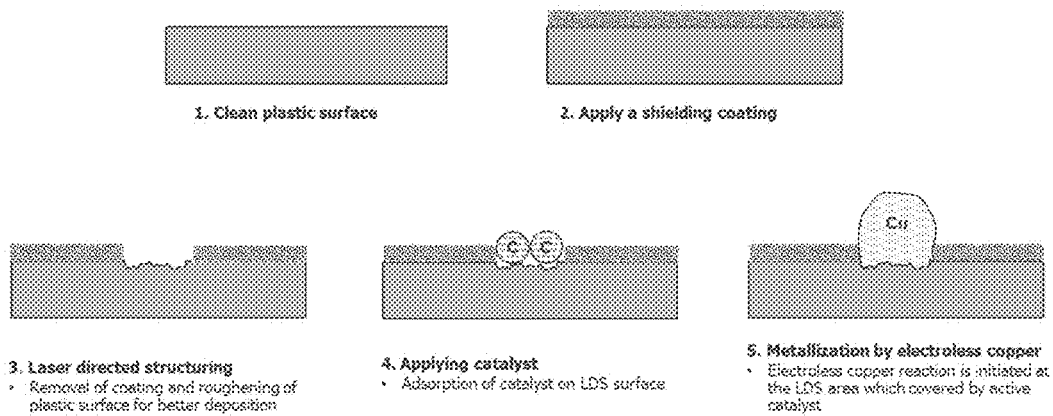

SHIELDING COATING FOR SELECTIVE METALLIZATION

FIELD OF THE INVENTION

The present invention is directed to shielding coatings for selective metallization of polymer substrates relating to molded interconnect devices. More specifically the present invention is directed to shielding coatings for selective metallization of polymer substrates for molded interconnect devices where the shielding coating acts as a barrier layer to subsequent catalyst and electroless metal plating.

BACKGROUND OF THE INVENTION

Laser direct structuring processes (LDS) have been developed and used for the selective plating of molded plastic materials for more than 10 years, so called molded interconnect devices (MID). With LDS it is possible to realize highly functional circuit layouts on complex 3-dimensional substrates. The basis of the process involves additive doped thermoplastics or thermosets with inorganic fillers, which allow the formation of circuit traces by means of laser activation, followed by metallization using electroless plating. The metal containing additives incorporated in such plastics are activated by the laser beam and become active as a catalyst for electroless copper plating on the treated areas of the surface of plastics to be plated. In addition to activation, the laser treatment may create a microscopically rough surface to which the copper becomes firmly anchored during metallization. However, such technology is limited to apply on additive doped plastics, while general types of engineering plastic without additive doping cannot be activated for electroless copper plating.

Another technology in use is proprietary paint together with LDS. It is done by firstly spraying a thin layer of paint on the plastic parts. The LDS process then creates the circuitry layout on the paint coating and in the meantime activates the paint on the circuitry. The plastic will then go through electroless copper plating for metallization. This approach can be extended to plastics without additive doping. However, it is still in prototype stages and not yet ready for mass production.

Laser restructuring printing (LRP) is another innovative technology for the MID application. LRP employs high precision printing to create conductive diagrams (silver paste) on the workpiece to form the layout of the circuit. The printed workpiece is then laser trimmed. A high precision circuit structure is produced on the workpiece. This technology involves higher start-up investment on costly 3D printing machines.

Another technology is semi-additive process (SAP). The first step is to plate a thin layer of electroless copper on the plastic substrates employing existing colloidal catalyst and electroless copper for metallization on printed circuit board. A layer of negative electrodeposited photoresist is coated on the plastic substrates. Upon exposure and development, the circuit pattern is exposed without covering the photoresist. The exposed circuit can be plated with copper to achieve required thickness and then nickel. The remaining photoresist is removed. Excess copper layer is removed by microetch. An advantage of this technology is to be able to apply lower cost electrolytic plating processes for full copper build and nickel instead of the usual electroless plating processes. The plastic substrate is already fully plated with a layer of electroless copper. This technology can also be applied on plastic without doping additives. However, since it does not involve using lasers to roughen the circuitry, plating adhesion is a concern. In addition, the process sequence is quite long and complicated, with additional photoresist processes involved.

Although there are various processes relating to selective metallization of polymer and plastic materials, there is still a need for an improved method of selective metallization of polymers and plastics, in particular MIDs.

SUMMARY OF THE INVENTION

A method of metallization of a polymer substrate including: providing a polymer substrate; applying a primer including a polyamine compound to the polymer substrate to provide a hydrophilic coating on the polymer substrate; applying a hydrophobic top coat directly adjacent the primer to form a shielding coating on the substrate, the hydrophobic top coat includes one or more compounds chosen from alkyl alcohol alkoxylates, alkyl thiols, non-polymer primary alkyl amines and non-polymer secondary alkyl amines; selectively etching the shielding coating to expose portions of the polymer substrate; providing a catalyst to the polymer substrate including the shielding coating; and selectively electroless metal plating the polymer substrate.

Shielding coatings may inhibit adsorption of catalysts on plastic substrates by their hydrophobic character which repels aqueous based catalysts or may deactivate adsorbed catalysts. In addition, the shielding coatings can inhibit background plating and overplating. Both ionic catalysts and colloidal catalysts can be used. Polymers with and without embedded catalysts can be used with the present invention. The methods of the present invention can be used in the formation of circuitry on 3-D polymer substrates.

BRIEF DESCRIPTION OF THE DRAWING

The FIGURE is a schematic illustrating an embodiment of the present invention.

DETAILED DESCRIPTION OF THE INVENTION

As used throughout this specification, the abbreviations given below have the following meanings, unless the context clearly indicates otherwise: g=gram; mg=milligram; mL=milliliter; L=liter; cm=centimeter; m=meter; mm=millimeter; µm=micron; ppm=parts per million; mg/L=ppm; M=molar; ° C.=degrees Centigrade; RT=room temperature; g/L=grams per liter; DI=deionized; MID=molded interconnect device; 3-D=three (3) dimensional; Pd=palladium; Nd:YAG=neodymium-doped yttrium aluminum garnet; EO=ethylene oxide; PO=propylene oxide; PO-b-EO=propylene oxide/ethylene oxide block copolymer; Mn=number average molecular weight; wt %=percent by weight; ABS=acrylonitrile-butadiene-styrene copolymers; White ABS=white colored ABS; PC=polycarbonate polymer; Black PC=black colored PC; GF=glass fiber; and $T_g$=glass transition temperature.

The term molded interconnect device or MID means an injection-molded thermoplastic part with integrated electronic circuit traces which typically has a 3-D shape or form. The term "background plating" means random metal deposition on a polymer or plastic surface where deposition of the metal is not intended. The term "overplating" means metal plating beyond the desired circuit pattern and the inability to control the metal plating. The term "monomer" or "monomeric" means a single molecule which may combine with one or more of the same or similar molecules. The term "oligomer" means two or three monomers combined to form a single molecule. The term "polymer" means two or more monomers combined or two or more oligomers combined to form a single molecule. The term "polymer" includes copolymers. The term "adjacent" means adjoining where two different surfaces contact each other to form a common interface. The terms "printed circuit board" and "printed wiring board" are used interchangeably throughout this specification. The terms "plating" and "deposition" are used interchangeably throughout this specification. All amounts are percent by weight, unless otherwise noted. All numerical ranges are inclusive and combinable in any order except where it is logical that such numerical ranges are constrained to add up to 100%.

The shielding coating of the present invention includes a primer composition which includes one or more polyamines and is directly applied adjacent to a surface of a polymer or plastic material of a substrate to provide a substantially hydrophilic coating on the polymer or plastic material followed by, without any intervening steps, except an optional rinse step, applying a hydrophobic top coat which includes one or more of alkyl alcohol alkoxylates, alkyl thiols, non-polymer primary alkyl amines and non-polymer secondary alkyl amines directly adjacent to the primer composition to form a shielding coating directly adjacent to the polymer material of the substrate. Accordingly, the shielding coating includes the primer which includes the polyamine which may bind to the polymer by Van der Waals forces and the top coat which includes one or more of alkyl alcohol alkoxylates, alkyl thiols, non-polymer primary alkyl amines and non-polymer secondary alkyl amines. While not being bound by theory, it is believed that hydrophilic portions of the compounds which are included in the hydrophobic top coat interact or intermix with the hydrophilic primer and the hydrophobic portions of the top coat compounds extend opposite to or away from the polymer material of the substrate to form a substantially hydrophobic top surface thus forming the shielding coating layer on the polymer substrate. The FIGURE illustrates the four basic steps of the present invention.

It is envisioned that any polyamine which can form a primer in the formation of the shielding coating of the present invention can be used to practice the invention. Polyamines of the present invention are included in amounts of 0.5 g/L to 20 g/L, preferably 1 g/L to 15 g/L, more preferably from 1 g/L to 10 g/L. Preferably, polyamines are chosen from polyalkylene polyamines and linear and branched polyalkyleneimines (PAI).

Preferred polyalkylene polyamines have a general formula:

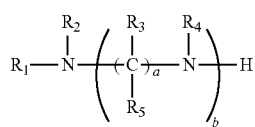
(I)

where $R_1$, $R_2$, $R_3$, $R_4$ and $R_5$ are independently chosen from hydrogen and linear or branched $(C_1-C_4)$alkyl where a is from 2 to 6 and b is from 2 to 6. Preferably $R_1$, $R_2$, $R_3$, $R_4$ and $R_5$ are independently chosen from hydrogen and $(C_1-C_2)$alkyl and a is from 2 to 6 and b is from 2 to 6. More preferably $R_1$ and $R_2$ are hydrogen and $R_3$, $R_4$ and $R_5$ are chosen from hydrogen and methyl and a is from 2 to 3 and b is from 2 to 6. Most preferably $R_1$, $R_2$, $R_3$, $R_4$ and $R_5$ are hydrogen and a is 2 and b is from 2 to 6. Exemplary polyalkylene polyamines having formula (I) are diethylenetriamine, triethylenetetramine, tetraethylenepentamine, pentaethylenehexamine and hexaethyleneheptamine.

Preferred polyalkyleneimines (PAIs) of the present invention have a general formula:

(II)

where d and e are the same or different and are at least 1. Preferably d is 1 to 4 and e is a value greater than 25. More preferably e is greater than 250 and most preferably e is greater than 2500. The most preferred molecular weight (Mn) is 800 and greater, more preferably from 1500 and greater and most preferably from 2500 and greater.

More preferred polyalkyleneimines (PAIs) are polyethyleneimines (PEIs). Such PEIs are believed to have the following general formula though it is not known for certain within the industry:

(III)

where f is from 1 to 120,000, preferably from 2 to 60,000, more preferably from 3 to 24,000 and g is from 1 to 60,000, preferably from 2 to 30,000, more preferably from 3 to 12,000. Exemplary polyethyleneimines of formula (III) are PEI-3, PEI-7, PEI-15, PEI-30, PEI-45, PEI-100, PEI-300, PEI-500, PEI-600, PEI-700, PEI-800, PEI-1000, PEI-1500, PEI-1800, PEI-2000, PEI-70,000, PEI-500,000 and PEI-5,000,000, where the integer refers to the molecular weight of the polymer. PEIs which are designated as such are available from Aldrich.

Polyethyleneimines (PEIs) of the present invention also include branched protonated polyethyleneimines (PEI salts). In branched protonated polyethyleneimines (PEI salts) a counterion of each protonated nitrogen center is balanced with an anion of an acid obtained during neutralization. Examples of branched protonated polyethyleneimines are PEI-hydrochloride salt, PEI-sulfuric acid salt, PEI-nitric acid salt, PEI-acetic acid salt, and PEI-fatty acid salt.

Optionally, the primer composition can include one or more metal ions to assist the mixing of the primer with the top coat compounds. Such metal ions include, but are not limited to copper ions, nickel ions, manganese ions and zinc ions. Such ions are added to the primer composition by their water soluble salts. Copper salts include but are not limited to copper sulfate, copper nitrate, copper chloride and copper acetate. Nickel salts include, but are not limited to nickel chloride, nickel sulfate and nickel sulfamate. Manganese salts include, but are not limited to manganese sulfate. Zinc salts include, but are not limited to zinc nitrate. Such salts are included in the primer in amounts of 0.5 g/L to 15 g/L, preferably from 1 g/L to 10 g/L. Preferably the metal ions of choice are copper and nickel. More preferably the ions of choice are copper ions. In general, it is preferred to include one or more metal ions in the primer solution; however, minor experimentation can be done to determine whether or not the one or more metal ions improve adsorption of the topcoat compounds to a particular polymer material.

The primer can be prepared by mixing the components in any order in water. A pH of the primer can range preferably from 7 to 13, more preferably from 8 to 12.

Prior to applying the primer to the polymer material, it is preferred that the polymer material is cleaned to remove any surface oils and residue from the surface of the polymer. The FIGURE illustrates a cleaned substrate at step 1. Conventional cleaning compositions and methods known in the art can be used. Typically cleaning is done at room temperature in a cleaning solution such as 10% CUPOSIT™ Z cleaning formulation (available from Dow Advanced Materials, Marlborough, Mass.) using ultrasound.

The primer can be applied directly adjacent the polymer material by immersing the substrate containing the polymer material in the primer or it can be sprayed directly adjacent to the polymer material. Preferably the primer is applied at temperatures from room temperature to 80° C., more preferably from 30° C. to 50° C. Dwell times prior to contact of the polymer material with the top coat range from preferably 1 minute to 10 minutes, more preferably from 3 minutes to 8 minutes.

After application of the primer to the polymer material of the substrate, the top coat is applied directly adjacent to the primer on the polymer material without any intervening steps in the method of the present invention except for an optional water rinse step. The top coat is applied directly adjacent to the primer by immersing the polymer material in a solution of the top coat or by spraying the top coat directly adjacent the primer coating the polymer material. The top coat is preferably applied at a temperature from room temperature to 80° C., more preferably from 30° C. to 50° C. Dwell times for the application of the top coat range from preferably 1 minute to 10 minutes, more preferably from 3 minutes to 8 minutes. After the top coat is applied to the primer, the top coat is allowed to dry on the primer to form the shielding coating directly adjacent to the polymer material in the substrate. The FIGURE illustrates the shielding coating adjacent the polymer substrate. Optionally, the top coat can be dried by blow drying at room temperature.

Top coats are chosen from alkyl alcohol alkoxylates, alkyl thiols and non-polymer primary and non-polymer secondary amines. They can be included in amounts of 0.5 g/L to 100 g/L, preferably from 1 g/L to 30 g/L. Alkyl alcohol alkoxylates include, but are not limited to polyethoxylated alcohol polymers having formula:

$$CH_3(CH_2)_m—(O—CH_2—CH_2)_n—OH \quad (IV)$$

where m is 7 to 25; and n represents an average degree of ethoxylation from 1 to 25. Preferably n is 7 to 15 and m is preferably from 13 to 25. Alkyl alcohol alkoxylates also include aliphatic ethoxylated/propoxylated copolymers having a formula:

$$R—O—(CH_2CH_2O)_x—(CH_2CH_2CH_2O)_y—H \quad (V) \text{ or}$$

$$R—O—(CH_2CH_2O)_x—(CH_2CH(CH_3)O)_y—H \quad (VI)$$

where R is a linear or branched chain alkyl group having 8 to 22 carbon atoms or an isotridecyl group and x and y are independently chosen from 1 to 20. Alkyl alcohol alkoxylates also include propoxylated/ethoxylated copolymers having a formula:

$$R—O—(CH_2CH(CH_3)O)_x—(CH_2CH_2O)_y—H \quad (VII) \text{ or}$$

$$R—O—(CH_2CH_2CH_2O)_x—(CH_2CH_2O)_y—H \quad (VIII)$$

where R and x and y are defined as above.

Alkyl thiols include, but are not limited to thiols having a formula:

$$R_6—SH \quad (IX)$$

where $R_6$ is a linear or branched alkyl group having from 1 to 24 carbon atoms, preferably, from 16 to 21 carbon atoms, an aryl group having from 5 to 14 carbon atoms and an alkylaryl where the alky of the alkylaryl is linear or branched with 1 to 24 carbon atoms and the aryl has from 5 to 14 carbon atoms. Exemplary alkyl thiols are ethanethiol, 1-propanethiol, 2-propanethiol, 1-butanethiol, 2-butanethiol, 2-methyl-1-propanethiol, 2-methyl-2-propanethiol, 2-methyl-1-butanethiol, 1-pentanethiol, 2,2-dimethyl-1-propanethiol, 1-hexanethiol, 1,6-hexanethiol, 1-heptanethiol, 2-ethylhexanethiol, 1-octanethiol, 1,8-octanethiol, 1-nonanethiol, 1,9-nonanethiol, 1-decanethiol, 1-undecanethiol, 1-dodecanthiol, 1-tridecanethiol, 1-tetradecanethiol, 1-pentadecanethiol, 1-hexadecanethiol, 1-heptadecanethiol, 1-octadecanethiol, 1-nonadecanthiol and 1-eicosanethiol. Preferred exemplary alky thiols are 1-hexadecanethiol, 1-heptadecanethiol, 1-octadecanethiol, 1-nonadecanthiol and 1-eicosanethiol.

Non-polymer primary and non-polymer secondary amines include, but are not limited to amine compounds having a formula:

$$R_7—CH_2—NH_2 \quad (X) \text{ or}$$

$$R_8—CH_2—NH—CH_2—R_9 \quad (XI)$$

where $R_7$, $R_8$ and $R_9$ are independently chosen from hydrogen, linear or branched, substituted or unsubstituted ($C_1$-$C_{24}$)alkyl, linear or branched, substituted or unsubstituted ($C_2$-$C_{20}$)alkenyl, substituted or unsubstituted ($C_3$-$C_8$)cycloalkyl and substituted or unsubstituted ($C_6$-$C_{10}$)aryl where substituent groups include, but are not limited to hydroxyl, hydroxy($C_1$-$C_{20}$)alkyl, amino, ($C_1$-$C_{20}$)alkoxy, halogen such as fluorine, chlorine and bromine, mercapto and phenyl. Preferably the amine compound is a non-polymer primary amine where $R_7$ is a linear or branched, substituted or unsubstituted ($C_1$-$C_{21}$)alkyl, more preferably, the amine compound is a non-polymer primary amine where $R_7$ is a linear or branched, unsubstituted ($C_1$-$C_{21}$)alkyl.

Exemplary primary amines include aminoethane, 1-aminopropane, 2-aminopropane, 1-aminobutane, 2-aminobutane, 1-amino-2-methylaminopentane, 2-amino-2-methylpropane, 1-aminopentane, 2-aminopentane, 3-aminopentane, neo-pentylamine, 1-aminohexane, 1-aminoheptane, 2-aminoheptane, 1-aminooctane, 2-aminooctane, 1-aminononane, 1-aminodecane, 1-aminododecane, 1-aminotridecane, 1-aminotetradecane, 1-aminopentadecane, 1-aminohexadecane, 1-aminoheptadecane and 1-aminooctadecane. Preferably the exemplary primary amines include 1-aminohexadecane, 1-aminoheptadecane and 1-aminooctadecane.

Optionally, the topcoat can include one or more organic solvents to assist in solubilizing the organic compounds. Organic solvents are included in amounts sufficient to solubilize the hydrophobic topcoat compounds. Preferably the one or more organic solvents are included in amounts of 0-60% by volume, preferably 10% by volume to 50% by volume. Such organic solvents include alcohols, diols, triols, and higher polyols. Suitable alcohols include ethanol, propanol, isopropanol, n-butanol, isobutanol, tert-butanol, ethylene glycol, propane-1,2-diol, butane-1,2-diol, butane-1,3-diol, butane-1,4-diol, propane-1,3-diol, hexane-1,4-diol, hexane-1,5-diol, hexane-1,6-diol, 2-methoxyethanol, 2-ethoxyethanol, 2-propoxyethanol and 2-butoxyethanol. Also included are unsaturated diols, such as butane-diol, hexane-diol and acetylenics such as butyne diol. A suitable triol is glycerol. Additional alcohols include triethylene glycol, diethylene glycol, diethylene glycol methyl ether, triethylene glycol monomethyl ether, triethylene glycol dimethyl ether, propylene glycol, dipropylene glycol, allyl alcohol, furfuryl alcohol, tetrahydrofurfuryl alcohol and block polymers of polyethylene and polyethylene glycol.

After the shielding coating is formed on the polymer material of the substrate, the shielding coating is selectively etched to form a pattern for electrical circuitry. The pattern may be etched by conventional methods known in the plating on plastics industry such as, but not limited to, laser etching, sand paper etching and plasma etching. Preferably, the shielding coating is selectively etched with a laser light such as a Nd:YAG, 1064 nm LPKF Laser available from LPKF Laser & Electronics AG. Laser etching enables the formation of fine line patterns for fine line circuitry since the laser light can be adjusted to a very fine dimension. This further enables the miniaturization of circuitry and for the miniaturization of 3-D electronic articles. Typical track widths are greater than or equal to 150 μm and spacing or gaps of greater than or equal to 200 μm. Etching is done to remove the shielding coating down to the polymer material and to roughen the polymer surface as illustrated in the FIGURE at step 3. If the polymer material has an embedded catalyst, sufficient polymer material at the surface is removed to expose the catalyst for electroless metal plating. If the polymer material does not include an embedded catalyst, a conventional ionic catalyst or colloidal catalyst can be applied to the polymer for electroless metal plating as illustrated in step 4 of the FIGURE. The ionic or colloidal catalyst can be applied by conventional means such as by dipping or spraying the catalyst on the etched substrate. Conventional catalyst parameters such as temperature, pH and dwell times of catalyst solutions can be used to practice the present invention. Depending on the type of catalyst conventional post-treatments may be used to activate the catalyst before electroless metallization. Ionic catalysts preferably include catalytic ions such as silver ions and palladium ions. Typically complexing agents are include with the metal ions to stabilize them prior to catalysis. Colloidal catalysts are preferably the conventional tin/palladium.

If the catalyst is an ionic catalyst, following application of the catalyst to the polymer and prior to metallization one or more reducing agents are applied to the catalyzed polymer to reduce the metal ions to their metallic state. Conventional reducing agents known to reduce metal ions to metal may be used. Such reducing agents include, but are not limited to dimethylamine borane, sodium borohydride, ascorbic acid, iso-ascorbic acid, sodium hypophosphite, hydrazine hydrate, formic acid and formaldehyde. Reducing agents are included in amounts to reduce substantially all of the metal ions to metal. Such amounts are generally conventional amounts and are well known by those of skill in the art.

The method of the present invention can be used to electroless metal plate various substrates such as printed circuit boards and MIDs. Preferably, the method of the present invention is used to selectively electroless metal plate MIDs which typically have a 3-D configuration, not the planar configuration of substrates such as printed circuit boards. Such 3-D configured substrates are difficult to electroless metal plate with continuous and uniform circuits because of their 3-D configurations where circuits are required to follow the irregular contours of the surface of the MID configuration. Such printed circuit boards and MIDs can include polymer materials of thermosetting resins, thermoplastic resins and combinations thereof, including fiber, such as fiberglass, and impregnated embodiments of the foregoing.

Thermoplastic resins include, but are not limited to acetal resins, acrylics, such as methyl acrylate, cellulosic resins, such as ethyl acetate, cellulose propionate, cellulose acetate butyrate and cellulose nitrate, polyethers, nylon, polyethylene, polystyrene, styrene blends, such as acrylonitrile styrene and copolymers and acrylonitrile-butadiene styrene copolymers, polycarbonates, polychlorotrifluoroethylene, and vinylpolymers and copolymers, such as vinyl acetate, vinyl alcohol, vinyl butyral, vinyl chloride, vinyl chloride-acetate copolymer, vinylidene chloride and vinyl formal.

Thermosetting resins include, but are not limited to allyl phthalate, furane, melamine-formaldehyde, phenol-formaldehyde and phenol-furfural copolymers, alone or compounded with butadiene acrylonitrile copolymers or acrylonitrile-butadiene-styrene copolymers, polyacrylic esters, silicones, urea formaldehydes, epoxy resins, allyl resins, glyceryl phthalates and polyesters.

The methods of the present invention can be used to plate substrates with both low and high $T_g$ resins. Low $T_g$ resins have a $T_g$ below 160° C. and high $T_g$ resins have a $T_g$ of 160° C. and above. Typically high $T_g$ resins have a $T_g$ of 160° C. to 280° C. or such as from 170° C. to 240° C. High $T_g$ polymer resins include, but are not limited to, polytetrafluoroethylene (PTFE) and polytetrafluoroethylene blends. Such blends include, for example, PTFE with polypheneylene oxides and cyanate esters. Other classes of polymer resins which include resins with a high Tg include, but are not limited to, epoxy resins, such as difunctional and multifunctional epoxy resins, bismaleimide/triazine and epoxy resins (BT epoxy), epoxy/polyphenylene oxide resins, acrylonitrile butadienestyrene, polycarbonates (PC), polyphenylene oxides (PPO), polypheneylene ethers (PPE), polyphenylene sulfides (PPS), polysulfones (PS), polyamides, polyesters such as polyethyleneterephthalate (PET) and polybutyleneterephthalate (PBT), polyetherketones (PEEK), liquid crystal polymers, polyurethanes, polyetherimides, epoxies and composites thereof.

While it is envisioned that the present invention can be used to electroless deposit any metal which may be electroless plated, preferably, the metal is chosen from copper, copper alloys, nickel or nickel alloys. An example of a commercially available electroless copper plating bath is CIRCUPOSIT™ 880 Electroless Copper bath (available from Dow Advanced Materials, Marlborough, Mass.). Another example of a commercially available electroless nickel plating bath is DURAPOSIT™ SMT 88 (available from Dow Advanced Materials, Marlborough, Mass.). An example of a commercially available electroless nickel bath is DURAPOSIT™ SMT 88 electroless nickel (available from Dow Advanced Materials, Marlborough, Mass.).

Typically sources of copper ions include, but are not limited to water soluble halides, nitrates, acetates, sulfates and other organic and inorganic salts of copper. Mixtures of one or more of such copper salts may be used to provide copper ions. Examples include copper sulfate, such as copper sulfate pentahydrate, copper chloride, copper nitrate, copper hydroxide and copper sulfamate. Conventional amounts of copper salts can be used in the compositions.

One or more alloying metals also can be included in the electroless compositions. Such alloying metals include, but are not limited to nickel and tin. Examples of copper alloys include copper/nickel and copper/tin. Typically the copper alloy is copper/nickel.

Sources of nickel ions for nickel and nickel alloy electroless baths can include one or more conventional water soluble salts of nickel. Sources of nickel ions include, but are not limited to, nickel sulfates and nickel halides. Sources of nickel ions can be included in the electroless alloying compositions in conventional amounts. Sources of tin ions include, but are not limited to tin sulfates, tin chloride and organic tin salts such as tin alkyl sulfonates. Tin salts can be included in the electroless alloying compositions in conventional amounts.

Electroless metal plating parameters, such as temperature and time can be conventional and are well known in the art. The pH of the electroless metal plating bath is typically alkaline.

During selective electroless metal plating of the exposed polymer material the portions of the polymer material coated with the shielding coating inhibit electroless metal plating as illustrated in step 5 of the FIGURE. Undesired background plating and overplating on portions of the polymer coated with the shielding coating are inhibited such that metal plating occurs substantially in the etched portions of the polymer. The shielding coating enables the formation of metal circuitry which follows the contours of a 3-D article while inhibiting background plating and overplating which can result in defective articles. The combination of the laser etching which enables fine line circuit patterning and the shielding coating enable the formation of continuous miniaturized circuits on the irregular surface of 3-D polymer substrates for the formation of miniaturized electronic articles.

The following examples are not intended to limit the scope of the invention but to further illustrate the invention.

Example 1

A plurality of polymer substrates was provided. Each substrate was treated and selectively electroless copper plated according to the method disclosed in Table 1 below. Most of the substrates had embedded catalysts of spinel heavy metal oxides or heavy metal complexes. Portions of the shielding coating where electroless copper plating was to take place were removed with silicon carbide type, P220 sandpaper. If the substrate did not have an embedded catalyst, an aqueous ionic catalyst was applied to the substrate prior to electroless plating. The aqueous ionic catalyst solution included 200 ppm palladium ions and 1,020 ppm 2,6-dimethylpyrazine. The reducing agent was dimethylamine borane at a concentration of 1 g/L. Electroless copper plating was done with CUPOSIT™ 71HS electroless copper bath available from Dow Advanced Materials.

TABLE 1

| Process Step | Component and Conditions |
| --- | --- |
| Cleaning | Ultrasonic cleaning with 10% CUPOSIT ™ Z at RT for 30 seconds |
| Primer | 0.03M (5.68 g/L) tetraethylenepentamine, 0.045M (6.05 g/L) copper chloride at 40° C. for 5 minutes, pH = 10 |
| Top Coat | 5 g/L polyethylene-block-poly(ethylene glycol) Mn ~1400, 30 mL/L (30 g/L) No Tarn PM-3 (1-octadecanethiol 10 wt/wt % and $C_{13}H_{27}$—$(OC_2H_4)_n$OH, where n is from 3 to 20, 85 wt/wt %), 500 mL/L propylene glycol at 40° C. for 5 minutes. |
| Selective removal of shielding coating | Sandpaper rubbing |
| Catalyst | Ionic catalyst at 40° C. for 5 minutes followed by dimethylamine borane at pH = 5 for 1 minute. |
| Electroless copper | CUPOSIT ™ 71HS at 56° C. for 15 minutes |

TABLE 2

| Polymer | Trade Name | Embedded Catalyst |
| --- | --- | --- |
| Transparent acrylic | — | No |
| White ABS | — | No |
| White PC/ABS | XANTAR ™ C CP200 | No |
| Black PC/ABS 30% GF | LAG ™ 2930 | No |
| White PC/ABS | XANTAR ™ 3724 | Yes |
| White PC/ABS | XANTAR ™ 3734 | Yes |
| Black PC | XANTAR ™ 3760 | Yes |
| Black PC/PET | XANTAR ™ 3780 | Yes |
| Black PC | XANTAR ™ 4700 | Yes |
| Black PC/ABS | H.W. TPJH231F | Yes |
| White PC/ABS | SABIC ™ NX 11302 | Yes |
| Black polyamide | RENY ™ XHP 1002 | Yes |
| Black polyamide | RENY ™ XHP 1003 | Yes |
| Black polyamide | RENY ™ XHP 2081 | Yes |

After each polymer substrate was electroless copper plated, the substrates were rinsed with DI water at room temperature and analyzed for the quality of the copper deposits. All of the copper deposits appeared uniform and bright. No background plating or overplating was observed on any of the substrates.

Example 2

A plurality of white ABS and a black PC (XANTAR™ 3730) polymer substrates were selectively electroless plated with copper according to the method disclosed in Table 3 below.

TABLE 3

| Process Step | Component and Conditions |
| --- | --- |
| Cleaning | Ultrasonic cleaning with 10% CUPOSIT ™ Z at RT for 30 seconds |
| Primer | 0.03M (5.68 g/L) tetraethylenepentamine, 0-0.06M (0-8.07 g/L) copper chloride at 40° C., pH = 9-10 for 5 minutes |
| Top Coat | 30 mL/L (30 g/L) No Tarn PM-3(1-octadecanethiol 10 wt/wt % and $C_{13}H_{27}$—$(OC_2H_4)_n$OH, where n is from 3 to 20, 85 wt/wt %), 500 mL/L propylene glycol at 40° C. for 5 minutes. |
| Selective removal of shielding coating | Sandpaper rubbing |
| Catalyst | Ionic catalyst as described in Example 1 at 40° C. for 5 minutes followed by dimethylamine borane at pH = 5 for 1 minute. |
| Electroless copper | CUPOSIT ™ 71HS at 56° C. for 15 minutes |

The polymer substrates were analyzed for the quality of the copper deposit and also for any background plating. All of the copper deposits appeared bright and smooth. Table 4 below discloses the results relating to background plating and the concentration of copper chloride in the primer composition.

TABLE 4

| Copper Chloride Concentration | Background Plating on White ABS | Background Plating on Black PC |
| --- | --- | --- |
| 0M (0 g/L) | No | Minor (<5% by visual inspection) |
| 0.015M (2.02 g/L) | No | No |
| 0.03M (4.04 g/L) | No | No |
| 0.045M (6.06 g/L) | No | No |
| 0.06M (8.07 g/L) | No | No |

With the exception of minor background plating of the black PC where the copper chloride was not included in the primer containing tetraethylenepentamine, all of the polymer samples appeared free of any background plating.

Example 3

A white ABS and a black PC (XANTAR™ 3730) were selectively electroless plated according to the method disclosed in Table 5 below.

TABLE 5

| Process Step | Component and Conditions |
| --- | --- |
| Cleaning | Ultrasonic cleaning with 10% CUPOSIT ™ Z at RT for 30 seconds |
| Primer | 5.2 g/L polyethyleneimine (Mn = 600,000-1,000,000) 50% w/v aqueous solution from Aldrich Chemicals, 0-0.06M (0-8.07 g/L) copper chloride at 40° C., pH = 9-10, for 5 minutes |
| Top Coat | 30 mL/L (30 g/L) No Tarn PM-3(1-octadecanethiol 10 wt/wt % and $C_{13}H_{27}$—$(OC_2H_4)_n$OH, where n is from 3 to 20, 85 wt/wt %), 500 mL/L propylene glycol at 40° C. for 5 minutes. |
| Selective removal of shielding coating | Sandpaper rubbing |
| Catalyst | Ionic catalyst as described in Example 1 at 40° C. for 5 minutes followed by dimethylamine borane at pH = 5 for 1 minute. |
| Electroless copper | CUPOSIT ™ 71HS at 56° C. for 15 minutes |

The polymer substrates were analyzed for the quality of the copper deposit and also for any background plating. All of the copper deposits appeared bright and smooth. Table 6 below discloses the results relating to background plating and the concentration of copper chloride in the primer composition.

TABLE 6

| Copper Chloride Concentration | Background Plating on White ABS | Background Plating on Black PC |
| --- | --- | --- |
| 0M (0 g/L) | Yes (100% of polymer surface was covered with copper) | Yes (100% of polymer surface was covered with copper) |
| 0.015M (2.02 g/L) | Minor (<5%) | Minor (<5%) |
| 0.03M (4.04 g/L) | Minor (~10%) | Minor (<5%) |
| 0.045M (6.06 g/L) | No | No |
| 0.06M (8.07 g/L) | No | No |

Although there was minor background plating where the concentration for copper chloride concentrations of 0.015 M and 0.03 M, the addition of copper chloride significantly inhibited background plating when the primer composition included polyethyleneimine.

What is claimed is:

1. A method of metallization of a polymer substrate comprising:
   a) providing a polymer substrate;
   b) applying a primer comprising a polyamine compound selected from the group consisting of linear or branched polyalkylene polyamines and linear or branched polyalkyleneimines to the polymer substrate to provide a hydrophilic coating on the polymer substrate;
   c) applying a hydrophobic top coat directly adjacent the primer to form a shielding coating on the substrate, the hydrophobic top coat comprises one or more compounds chosen from alkyl alcohol alkoxylates, alkyl thiols, non-polymer primary alkyl amines and non-polymer secondary alkylamines;
   d) selectively etching the shielding coating to expose portions of the polymer substrate;
   e) providing a catalyst to the polymer substrate comprising the shielding coating; and
   f) selectively electroless metal plating the polymer substrate.

2. The method of claim 1, wherein the polyalkylene polyamines have a general formula:

$$R_1-N\underset{R_5}{\overset{R_2}{|}}\left(\underset{|}{\overset{R_3}{|}}C\right)_a-N\underset{}{\overset{R_4}{|}}-H \quad (I)$$

where $R_1$, $R_2$, $R_3$, $R_4$ and $R_5$ are independently chosen from hydrogen and linear or branched $(C_1-C_4)$alkyl where a is from 2 to 6 and b is from 2 to 6.

3. The method of claim 2, wherein the polyalkylene polyamines are chosen from diethylenetriamine, triethylenetetramine, tetraethylenepentamine, pentaethylenehexamine and hexaethyleneheptamine.

4. The method of claim 1, wherein the linear polyalkyleneimines have a formula:

$$H-(CH_2-(CH_2)_d-NH-)_e-H \quad (II)$$

where d and e are the same or different and are at least 1.

5. The method of claim 1, wherein the linear or branched polyalkyleneimines have a formula:

$$-(NHCH_2CH_2-)_f[-N(CH_2CH_2NH_2)CH_2CH_2-]_g \quad (III)$$

where f is from 1 to 120,000 and g is from 1 to 60,000.

6. The method of claim 1, wherein the branched polyalkyleneimines are protonated polyethyleneimines (PEI salts).

7. The method of claim 1, wherein the alkyl alcohol alkoxylates are polyethoxylated alcohol polymers having a formula:

$$CH_3(CH_2)_m-(O-CH_2-CH_2)_n-OH \quad (IV)$$

where m is 7 to 25; and n represents an average degree of ethoxylation from 1 to 25.

8. The method of claim 1, wherein the alkyl alcohol alkoxylates are aliphatic ethoxylated/propoxylated copolymers having a formula:

$$R-O-(CH_2CH_2O)_x-(CH_2CH_2CH_2O)_y-H \quad (V) \text{ or}$$

$$R-O-(CH_2CH_2O)_x-(CH_2CH(CH_3)O)_y-H \quad (VI)$$

where R is a linear or branched chain alkyl group having 8 to 22 carbon atoms or an isotridecyl group and x and y are independently chosen from 1 to 20.

9. The method of claim 1, wherein the alkyl alcohol alkoxylates are aliphatic propoxylated/ethoxylated copolymers having the following formula:

$$R-O-(CH_2CH(CH_3)O)_x-(CH_2CH_2O)_y-H \quad (VII) \text{ or}$$

$$R-O-(CH_2CH_2CH_2O)_x-(CH_2CH_2O)_y-H \quad (VIII)$$

where R is a linear or branched chain alkyl group having 8 to 22 carbon atoms or an isotridecyl group and x and y are independently chosen from 1 to 20.

10. The method of claim 1, wherein the alkyl thiols have a formula:

$$R_6\text{—SH} \quad (IX)$$

wherein $R_6$ is a linear or branched alkyl group having from 1 to 24 carbon atoms, an aryl group having from 5 to 14 carbon atoms or an alkylaryl, wherein the alky of the alkylaryl is linear or branched with 1 to 24 carbon atoms and the aryl has from 5 to 14 carbon atoms.

11. The method of claim 1, wherein the non-polymer primary amines have a formula:

$$R_7\text{—CH}_2\text{—NH}_2 \quad (X)$$

wherein $R_7$, are independently chosen from hydrogen, linear or branched, substituted or unsubstituted $(C_1\text{-}C_{20})$alkyl, linear or branched, substituted or unsubstituted $(C_2\text{-}C_{20})$alkenyl, substituted or unsubstituted $(C_3\text{-}C_8)$cycloalkyl or substituted or unsubstituted $(C_6\text{-}C_{10})$aryl.

12. The method of claim 1, wherein the non-polymer secondary amines have a formula:

$$R_8\text{—CH}_2\text{—NH—CH}_2\text{—}R_9 \quad (XI)$$

wherein $R_8$ and $R_9$, are independently chosen from hydrogen, linear or branched, substituted or unsubstituted $(C_1\text{-}C_{20})$alkyl, linear or branched, substituted or unsubstituted $(C_2\text{-}C_{20})$alkenyl, substituted or unsubstituted $(C_3\text{-}C_8)$cycloalkyl or substituted or unsubstituted $(C_6\text{-}C_{10})$aryl.

13. The method of claim 1, wherein the primer further comprises one or more metal ions.

14. The method of claim 13, wherein the one or more metal ions are chosen from copper, nickel, manganese and zinc.

15. The method of claim 1, wherein the hydrophobic top coat further comprises one or more organic solvents.

16. The method of claim 15, wherein the one or more organic solvents are chosen from alcohols, diols, triols and higher polyols.

17. The method of claim 1, wherein a metal is copper.

* * * * *